United States Patent
Ichikawa et al.

(10) Patent No.: US 12,257,574 B2
(45) Date of Patent: Mar. 25, 2025

(54) HONEYCOMB STRUCTURE, EXHAUST GAS PURIFICATION CATALYST, AND EXHAUST GAS PURIFICATION SYSTEM

(71) Applicant: NGK Insulators, Ltd., Nagoya (JP)

(72) Inventors: Shuichi Ichikawa, Nagoya (JP); Takuya Ishihara, Nagoya (JP); Yukio Miyairi, Nagoya (JP); Masaaki Masuda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 246 days.

(21) Appl. No.: 17/930,147

(22) Filed: Sep. 7, 2022

(65) Prior Publication Data

US 2022/0410136 A1    Dec. 29, 2022

Related U.S. Application Data

(63) Continuation of application No. PCT/JP2020/042650, filed on Nov. 16, 2020.

(30) Foreign Application Priority Data

Mar. 19, 2020  (JP) ................. 2020-049800

(51) Int. Cl.
   *B01J 35/33*      (2024.01)
   *B01D 53/94*      (2006.01)
   (Continued)

(52) U.S. Cl.
   CPC .......... *B01J 35/33* (2024.01); *B01D 53/944* (2013.01); *B01D 53/9477* (2013.01);
   (Continued)

(58) Field of Classification Search
   CPC ........ B01J 35/33; B01J 23/78; B01J 23/8472; B01J 35/56; B01J 37/0009; B01J 37/0215;
   (Continued)

(56) References Cited

U.S. PATENT DOCUMENTS

| 2012/0003420 A1* | 1/2012 | Betsushiyo .......... C04B 35/573 |
| | | 428/116 |
| 2017/0022868 A1 | 1/2017 | Crawford et al. |

(Continued)

FOREIGN PATENT DOCUMENTS

| JP | 2010-013945 A | 1/2010 |
| JP | 2019-188272 A | 10/2019 |

(Continued)

OTHER PUBLICATIONS

Machine Translation of JP-2019173600-A (Year: 2019).*

(Continued)

*Primary Examiner* — Brandon D Lee
(74) *Attorney, Agent, or Firm* — BURR PATENT LAW, PLLC

(57) ABSTRACT

A pillar shaped honeycomb structure for induction heating, the honeycomb structure being made of ceramics and including: an outer peripheral wall; and a partition wall disposed on an inner side of the outer peripheral wall, the partition wall defining a plurality of cells, each of the cells penetrating from one end face to other end face to form a flow path, wherein a composite material containing a conductor and a non-conductor is provided in the cells in a region of 50% or less of the total length of the honeycomb structure from one end face, and wherein the conductor is a conductor that generates heat in response to a change in a magnetic field.

16 Claims, 11 Drawing Sheets

(51) Int. Cl.
*B01J 23/78* (2006.01)
*B01J 23/847* (2006.01)
*B01J 35/56* (2024.01)
*F01N 3/022* (2006.01)
*F01N 3/10* (2006.01)
*F01N 3/20* (2006.01)

(52) U.S. Cl.
CPC ........... *B01J 23/78* (2013.01); *B01J 23/8472* (2013.01); *B01J 35/56* (2024.01); *F01N 3/022* (2013.01); *F01N 3/101* (2013.01); *F01N 3/2013* (2013.01); *F01N 3/2066* (2013.01); *B01D 2255/9155* (2013.01); *F01N 2370/04* (2013.01)

(58) Field of Classification Search
CPC .............. B01D 53/944; B01D 53/9477; B01D 2255/9155; B01D 46/2429; F01N 3/022; F01N 3/101; F01N 3/2013; F01N 3/2066; F01N 2370/04; F01N 3/2828; F01N 3/027; F01N 3/035; F01N 3/08; F01N 3/28; C04B 2111/00793; C04B 2111/00801; C04B 35/111; C04B 35/6365; C04B 38/0019; C04B 41/00; C04B 2235/3206; C04B 2235/3217; C04B 2235/3418; C04B 2235/349; C04B 2235/5436; C04B 2235/6021; C04B 2235/6022; C04B 2235/604; C04B 2235/606; C04B 2235/95; C04B 2237/06; C04B 2237/064; C04B 2237/068; C04B 2237/08; C04B 2237/083; C04B 2237/123; C04B 2237/16; C04B 2237/341; C04B 2237/343; C04B 2237/346; C04B 2237/365; C04B 2237/368; C04B 2237/708; C04B 35/185; C04B 35/195; C04B 35/478; C04B 35/565; C04B 35/584; C04B 37/005; C04B 37/006; Y02A 50/20; Y02T 10/12
See application file for complete search history.

(56) References Cited

U.S. PATENT DOCUMENTS

| | | | |
|---|---|---|---|
| 2017/0218823 A1* | 8/2017 | Crawford | F01N 3/2013 |
| 2018/0093929 A1* | 4/2018 | Yamada | B01D 53/945 |
| 2018/0185789 A1 | 7/2018 | Crawford et al. | |
| 2019/0070596 A1* | 3/2019 | Yang | B01D 53/9422 |
| 2019/0323401 A1 | 10/2019 | Miyairi et al. | |
| 2021/0115825 A1 | 4/2021 | Miyairi et al. | |
| 2021/0291157 A1 | 9/2021 | Miyairi et al. | |

FOREIGN PATENT DOCUMENTS

| | | | |
|---|---|---|---|
| JP | 6585548 B2 | | 10/2019 |
| JP | 2019173600 A | * | 10/2019 |
| WO | 2020/031434 A1 | | 2/2020 |
| WO | 2020/110396 A1 | | 6/2020 |

OTHER PUBLICATIONS

English translation of the International Preliminary Report on Patentability (Chapter I) dated Sep. 29, 2022 (Application No. PCT/JP2020/042650).

International Search Report and Written Opinion (Application No. PCT/JP2020/042650) dated Jan. 12, 2021.

* cited by examiner

HONEYCOMB STRUCTURE, EXHAUST GAS PURIFICATION CATALYST, AND EXHAUST GAS PURIFICATION SYSTEM

FIELD OF THE INVENTION

The present invention relates to a honeycomb structure, an exhaust gas purification catalyst, and an exhaust gas purification system.

BACKGROUND OF THE INVENTION

Exhaust gases from motor vehicles typically contain harmful components such as carbon monoxide, hydrocarbons and nitrogen oxides and/or fine particles of carbon or the like as a result of incomplete combustion. From the viewpoint of reducing health hazards to a human body, there is an increasing need for reducing harmful gas components and fine particles in exhaust gases from motor vehicles.

However, at present, these harmful components are discharged during a period immediately after an engine is started, i.e., a period during which a catalyst temperature is lower and a catalytic activity is insufficient. Therefore, the harmful components in the exhaust gas may be discharged without being purified by the catalyst before reaching a catalyst activating temperature. In order to satisfy such a need, it is necessary to reduce emission as much as possible, which is discharged without being purified by a catalyst before reaching the catalyst activating temperature. For example, measures using an electric heating technique are known in the art.

As such a technique, Patent Literature 1 discloses that a DOC (diesel oxidation catalyst) is surrounded by an IH coil and the DOC itself is heated by induction heating to purify an exhaust gas.

Patent Literature 2 discloses a catalyst support having a structure in which metal particles or metal pieces are provided in a plurality of cells of a ceramic support over the entire cell and the metal particles or metal pieces are allowed to generate heated by induction heating.

Patent Literature 3 discloses an exhaust gas purification device having a structure in which rod-shaped conductive members are inserted into cells of a ceramic substrate and the conductive members are allowed to generate heat by induction heating.

CITATION LIST

Patent Literatures

[Patent Literature 1] Japanese Patent No. 6585548 B
[Patent Literature 2] Japanese Patent Application Publication No. 2019-188272 A
[Patent Literature 3] Japanese Patent Application Publication No. 2019-173600 A

SUMMARY OF THE INVENTION

The technique described in Patent Literature 1 can reduce power consumption as compared with external heating by an electric heater. However, the DOC described in Patent Literature 1 is composed of a metal honeycomb, and for effective heating of the metal honeycomb, it is necessary to surround the entire circumference by the IH coil. Therefore, there is problems that the size of the device used for the exhaust gas purification system is increased and the power consumption is also increased. In particular, the problem become more remarkable in an exhaust gas purification system for a larger vehicle having a larger volume.

Further, in the technique described in Patent Literature 2, the entire honeycomb structure is surrounded by the IH coil in order to generate heat by induction heating of the metal particles or metal pieces provided throughout the cells. Therefore, as with Patent Literature 1, Patent Literature 2 has problems that the size of the device is increased and the power consumption is also increased.

Furthermore, in the technique described in Patent Literature 3, the rod-shaped conductive members are inserted into the cells of the honeycomb structure, so that the rod-shaped conductive members may damage the cells due to the vibration of the honeycomb structure.

In view of such circumstances, an object of the present invention is to provide a honeycomb structure for inductive heating, which is capable of induction heating of its own honeycomb structure or of heating of the honeycomb structure provided on the downstream side, and which suppresses power consumption during inductive heating and suppress damage to the cells of the honeycomb structure. Another object of the present invention is to provide an exhaust gas purification catalyst and an exhaust gas purification system, which include the above honeycomb structure for induction heating.

The above problems are solved by the following invention. The present invention is specified as follows:

(1) A pillar shaped honeycomb structure for induction heating, the honeycomb structure being made of ceramics and comprising:
an outer peripheral wall; and
a partition wall disposed on an inner side of the outer peripheral wall, the partition wall defining a plurality of cells, each of the cells penetrating from one end face to other end face to form a flow path,
wherein a composite material comprising a conductor and a non-conductor is provided in the cells in a region of 50% or less of the total length of the honeycomb structure from one end face, and
wherein the conductor is a conductor that generates heat in response to a change in a magnetic field.

(2) A pillar shaped honeycomb structure for induction heating, the honeycomb structure comprising pillar shaped honeycomb segments joined together via joining material layers,
wherein each of the pillar shaped honeycomb segments comprises: an outer peripheral wall; and a partition wall disposed on an inner side of the outer peripheral wall, the partition wall defining a plurality of cells, each of the cells penetrating from one end face to other end face to form a flow path, and
wherein a conductor is provided in the joining material layers in a region of 50% or less of the total length of the honeycomb structure from one end face, and
wherein the conductor is a conductor that generates heat in response to a change in a magnetic field.

(3) An exhaust gas purification catalyst, comprising:
the honeycomb structure according to (1) or (2); and
a catalyst supported in the cells of the honeycomb structure,
wherein the catalyst is at least one selected from the group consisting of oxidation catalysts, three-way catalysts, $NO_x$ storage reduction catalysts, $NO_x$ selective reduction catalysts, hydrocarbon adsorption catalysts, hydrocarbons, carbon monoxide oxidation catalysts, and ammonia slip (oxidation) catalysts.

(4) An exhaust gas purification system, comprising:
the honeycomb structure A according to (1) or (2), the honeycomb structure A being arranged on an upstream side in a gas flow direction; and
at least one honeycomb structure B arranged on a downstream side of the honeycomb structure.

According to the present invention, it is possible to provide a honeycomb structure for inductive heating, which is capable of induction heating of its own honeycomb structure or of heating of the honeycomb structure provided on the downstream side, and which suppresses power consumption during inductive heating and suppress damage to the cells of the honeycomb structure. It is also possible to provide an exhaust gas purification catalyst and an exhaust gas purification system, which include the above honeycomb structure for induction heating.

DETAILED DESCRIPTION OF THE INVENTION

Hereinafter, embodiments of a honeycomb structure, an exhaust gas purification catalyst and an exhaust gas purification system according to the present invention will be described with reference to the drawings. However, the present invention is not limited to these embodiments, and various changes, modifications, and improvements may be made based on knowledge of one of ordinary skill in the art, without departing from the scope of the present invention.

<1. Honeycomb Structure>

Embodiment 1

Figure 1:
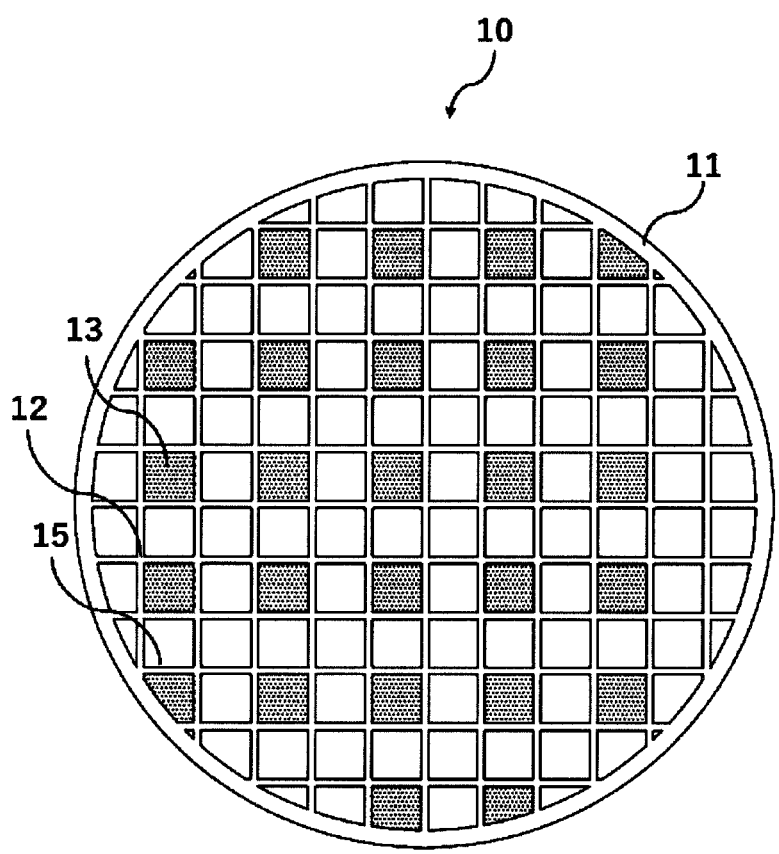
FIG. 1 is a schematic cross-sectional view of a honeycomb structure 10 according to Embodiment 1 of the present invention, which is perpendicular to an extending direction of cells 15.
Figure 2:
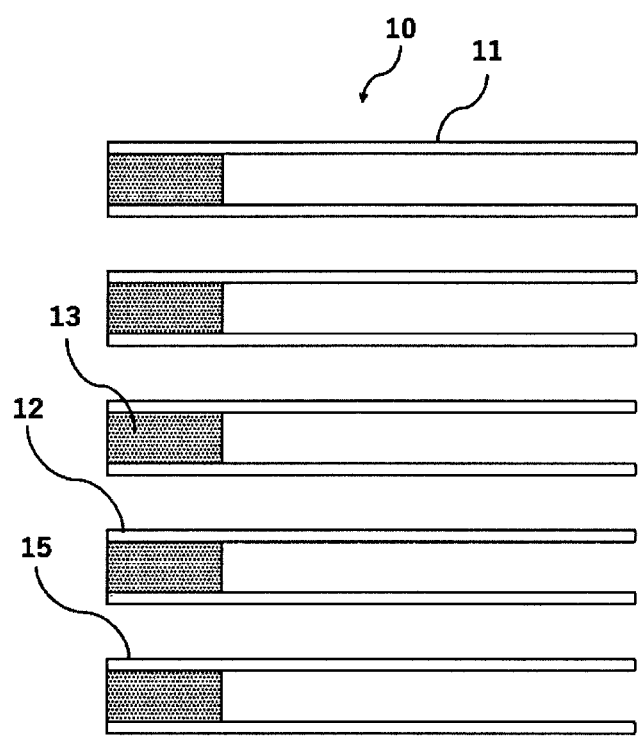
FIG. 2 is a schematic cross-sectional view of a honeycomb structure 10 according to Embodiment 1 of the present invention, which is parallel to an extending direction of cells 15.

FIG. 1 is a schematic cross-sectional view of a honeycomb structure 10 for induction heating according to Embodiment 1 of the present invention, which is perpendicular to an extending direction of cells 15. FIG. 2 is a schematic cross-sectional view of the honeycomb structure 10 according to Embodiment 1 of the present invention, which is parallel to the extending direction of the cells 15.

The honeycomb structure 10 is formed in a pillar shape, and includes: an outer peripheral wall 11; and a partition wall 12 made of ceramics, the partition wall 12 being arranged an inner side of the outer peripheral wall 11 and defining a plurality of cells 15 extending from upstream to downstream in a gas flow direction to form flow paths.

Although materials of the partition wall 12 and the outer peripheral wall 11 of the honeycomb structure 10 are not particularly limited, the honeycomb structure 10 is typically formed of a ceramic material. Examples of the ceramic material include a sintered body of ceramics comprised of cordierite, silicon carbide, aluminum titanate, silicon nitride, mullite, alumina, a silicon-silicon carbide-based composite material, or silicon carbide-cordierite-based composite material, in particular, a sintered body mainly based on a silicon-silicon carbide composite material or silicon carbide. As used herein, the expression "silicon carbide-based" means that the honeycomb structure 10 contains silicon carbide in an amount of 50% by mass or more of the entire honeycomb structure 10. The phrase "the honeycomb structure 10 is mainly based on a silicon-silicon carbide composite material" means that the honeycomb structure 10 contains 90% by mass or more of the silicon-silicon carbide composite material (total mass) based on the entire honeycomb structure 10. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure 10.

Preferably, the honeycomb structure 10 is formed of at least one ceramic material selected from the group consisting of cordierite, silicon carbide, aluminum titanate, silicon nitride, mullite, and alumina.

The shape of each of the cells of the honeycomb structure 10 may be, but not particularly limited to, a triangle, a quadrangle, a pentagon, a hexagon, an octagon or a combination thereof, in a cross section orthogonal to the central axis of the honeycomb structure 10. Among these, the quadrangle and the hexagon are preferable in terms of easily achieving both structural strength and heating uniformity.

Further, an outer shape of the honeycomb structure 10 may be, but not particularly limited to, a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like.

The partition wall 12 of the honeycomb structure 10 preferably has a thickness of from 0.05 to 0.50 mm, and more preferably from 0.10 to 0.45 mm, in terms of ease of production. For example, the thickness of 0.10 mm or more improves the strength of the honeycomb structure 10. The thickness of 0.50 mm or less can reduce pressure loss. It should be noted that the thickness of the partition walls 12 is an average value measured by a method for observing the axial cross section with a microscope.

Further, the partition wall 12 forming the honeycomb structure 10 preferably has a porosity of from 20 to 70%. In terms of ease of production, the porosity of the partition wall 12 is preferably 20% or more. The porosity of 70% or less can maintain the strength of the honeycomb structure 10.

The porous partition wall 12 preferably has an average pore diameter of from 2 to 30 μm, and more preferably from 5 to 25 μm. The average pore diameter of 2 μm or more can lead to easy production. The average pore diameter of 30 μm or less can maintain the strength of the honeycomb structure 10. It should be noted that the terms "average pore diameter" and "porosity" as used herein mean an average pore diameter and a porosity measured by a mercury intrusion method.

The honeycomb structure 10 preferably has a cell density in a range of from 5 to 150 cells/cm$^2$, and more preferably 5 to 100 cells/cm$^2$, and even more preferably in a range of from 31 to 80 cells/cm$^2$, although not particularly limited thereto.

Such a honeycomb structure 10 is produced by forming a green body containing a ceramic raw material into a honeycomb shape having the partition wall 12 that penetrates from one end face to other end face and defines a plurality of cells 15 to form flow paths for a fluid, thereby forming a honeycomb formed body, and drying the honeycomb formed body and then firing it. When such a honeycomb structure is used as the honeycomb structure 10 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 10 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

The honeycomb structure 10 is not limited to an integral type honeycomb structure 10 in which the partition wall 12 is integrally formed. For example, the honeycomb structure 10 may be a honeycomb structure 10 in which pillar shaped honeycomb segments each having the partition wall 12 made of ceramics, and a plurality of cells 15 defined by the partition wall 12, to form flow paths for a fluid are combined via joining material layers (which, hereinafter, may be referred to as a "joined honeycomb structure").

A composite material 13 composed of a conductor and a non-conductor is provided in any of the cells 15 in a region of 50% or less of the total length of the honeycomb structure 10 from one end face. The composite material 13 is filled in any of the cells 15. The conductor contained in the composite material 13 is a conductor that generates heat in response to a change in a magnetic field. Thus, the honeycomb structure 10 contains the conductor that generates heat in response to the change in the magnetic field in any of the cells 15 in the region of 50% or less of the total length from one end face, and only the region of 50% or less of the total length of the honeycomb structure 10 from one end face is surrounded by a coil, thereby allowing the conductor to generate heat by induction heating. When one end face of the entire length is the end face on the upstream side in the gas flow direction, the conductor provided in the region of 50% or less from the upstream side of the total length of the honeycomb structure 10 generates heat, so that a gas heated on the upstream side is directed to the downstream side in the cells 15 of the honeycomb structure 10, whereby the downstream side of the honeycomb structure 10 is also heated. On the other hand, when one end face of the entire length is the end face on the downstream side in the gas flow direction, the conductor provided in the region of 50% or less from the downstream side of the total length of the honeycomb structure 10 generates heat, so that the gas heated by the honeycomb structure 10 is directed to the downstream side, whereby an effect of heating other support arranged on the downstream side of the honeycomb structure 10 can be further enhanced. Therefore, the entire honeycomb structure 10 can be heated or other honeycomb structure(s) arranged downstream of the former can be heated at the same time, without being surrounded by the coil and heated over the total length of the honeycomb structure 10. Therefore, the power consumption during induction heating is suppressed. Further, the arrangement of the exhaust gas purification system using the honeycomb structure 10 can be simplified. Further, since the composite material 13 contains not only the conductor but also the non-conductor having a thermal expansion coefficient or a Young's modulus lower than that of the conductor, the thermal stress generated by the thermal expansion of the composite material 13 upon heating of the honeycomb structure 10 is relaxed, and the breakage of the cells 15 can be satisfactorily suppressed.

Further, as will be described below, the supported conductor is often a metal or the like having a higher density than that of the material of the honeycomb structure 10, so that it has the characteristic that once the conductor is heated, the heated portion is difficult to become cold as compared with the case where there is no conductor, due to the heat capacity of the conductor. This effect is also advantageous in enhancing the heating effect. In particular, the heating effect can also be enhanced by using the honeycomb structure 10 having decreased weight such as by reducing the thickness of the partition wall 12. In addition, for example, it can be configured so that the temperature of the exhaust gas directed to the downstream side is prevented from being decreased by arranging the conductor only in the region on the downstream side. Furthermore, to address the problems of decreased mechanical strength and the like, which is caused by reducing the weight of the honeycomb structure 10, the conductor can also be arranged on the downstream side to increase the density of the entire honeycomb structure 10, thereby compensating the mechanical strength.

The size of the honeycomb structure 10 is not particularly limited. The honeycomb structure 10 may preferably have a diameter of 150 mm or more or a volume of 3 L or more. When formed in such a size, the honeycomb structure 10 can be used for a large vehicle such as a diesel vehicle, a liquefied natural gas vehicle, a compressed natural gas vehicle, or a synthetic fuel vehicle, and results in an increased effect of reducing power consumption during induction heating.

The composite material 13 may be provided in the cells 15 in the region of 40% or less of the total length of the honeycomb structure 10, or may be provided in the cells 15 in the region of 30% or less, or may be provided in the cells 15 in the region of 20% or less.

It is preferable that the end face on the downstream side of the honeycomb structure 10 is not provided with plugged portions. According to such a structure, the pressure loss cannot be increased, and the gas can be more uniformly fed to the downstream side, which will also be effective in suppressing the power consumption.

The cells 15 filled with the composite material 13 may be arranged at intervals of one cell, or may be arranged at intervals of a plurality of cells, or may be continuously arranged, for the cells vertically and horizontally adjacent to each other. The number, arrangement, and the like of the cells 15 filled with the composite material 13 are not limited, and they may be appropriately designed as needed. From the viewpoint of enhancing the heating effect, it is better to increase the number of the cells filled with the composite material 13, but from the viewpoint of reducing the pressure loss, it is better to reduce it as much as possible.

The composite material 13 preferably contains 50 to 95% by mass of the conductor. The content of the conductor in the composite material 13 of 50% by mass or more results in an improved induction heating efficiency of the honeycomb structure 10. The content of the conductor in the composite material 13 of 95% by mass or less result in further relaxation of the thermal expansion of the composite material 13 during heating of the honeycomb structure 10, so that the damage of the cells 15 can be well suppressed. The composite material 13 preferably contains 55 to 90% by mass of the conductor, and even more preferably 60 to 85% by mass of the conductor.

The composite material 13 preferably has a porosity of 30 to 70%. The porosity of the composite material 13 of 30% or more can allow the cells 15 filled with the composite material 13 to be more satisfactorily used as an exhaust gas flow path. The porosity of the composite material 13 of 70% or less results in further improved induction heating performance of the honeycomb structure 10. The porosity of the composite material 13 is more preferably 35 to 65%, and even more preferably 40 to 60%. It should be noted that since it is difficult to measure the porosity of the composite material 13 supported on the honeycomb structure 10 by the mercury intrusion method from the viewpoint of sample cutting, in this case, it can be measured by image analysis.

The conductor contained in the composite material 13 is preferably a porous body. According to such a structure, the durability of the composite material 13 is improved. Examples of the material of the conductor of the porous body include the balance Fe-18% by mass of Cr-9% by mass of Ni, Cu and the like.

The conductor contained in the composite material 13 is preferably a magnetic substance. According to such a structure, the induction heating characteristics of the honeycomb structure 10 are further improved. The magnetic substance making up the conductor is a magnetic material, and is magnetized by a magnetic field, and has a state of magnetization variable depending on the intensity of the magnetic field. This is represented by a "magnetization curve". The magnetization curve may have a magnetic field H on a horizontal axis and a magnetic flux density B on a vertical axis (B-H curve). A state where no magnetic field is applied to the magnetic material refers to a degaussing state, which is represented by an origin O. As a magnetic field is applied, a curve in which the magnetic flux density increases from the origin O to a saturated state is drawn. The curve is an "initial magnetization curve". A slope of a straight line connecting a point on the initial magnetization curve to the origin is a "magnetic permeability". The magnetic permeability indicates an ease of magnetization of the magnetic substance in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

The magnetic substance making up the conductor preferably has a maximum magnetic permeability of 500 or more. According to such a configuration, when the honeycomb structure 10 is subjected to the electromagnetic induction heating, the temperature can be raised in a short period of time until a temperature at which water vaporizes (about 100° C.), and further until a temperature at which the catalyst is activated (about 300° C.). The magnetic substance making up the conductor may more preferably have a maximum magnetic permeability of 1000 or more, and even more preferably a maximum magnetic permeability of 2000 or more. Examples of the magnetic substance having a maximum magnetic permeability of 500 or more include the balance Fe-10% by mass of Si-5% by mass of Al, 49% by mass of Co-49% by mass of Fe-2% by mass of V, the balance Fe-36% by mass of Ni, the balance Fe-45% by mass of Ni, the balance Fe-35% by mass of Cr, the balance Fe-18% by mass of Cr, the balance Fe-16% by mass of Cr-8% by mass of Al, and the like.

The magnetic substance making up the conductor preferably has a Curie temperature of 450° C. or more. The Curie temperature of the magnetic substance making up the conductor of 400° C. or more can enable a honeycomb temperature sufficient to increase the catalyst temperature to the catalyst activation temperature or more to be reached. The magnetic substances having a curry temperature of 450° C. or more include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; the balance Fe-3% by mass of Si; the balance Fe-6.5% by mass of Si; the balance Fe-18% by mass of Cr; the balance Fe-16% by mass of Cr-8% by mass of Al; the balance Ni-13% by mass of Fe-5.3% by mass of Mo; the balance Fe-45% by mass of Ni; and the like. Here, the Curie temperature of the magnetic substance refers to a temperature at which a ferromagnetic property is lost.

The magnetic substance making up the conductor preferably has an intrinsic resistance value of 20 μΩcm or more at 25° C. Such a configuration can lead to an increased amount of heat generated by induction heating. Examples of the magnetic substances having an intrinsic resistance value of 50 μΩcm or more at 25° C. include the balance Fe-18% by mass of Cr; the balance Fe-13% by mass of Cr-2% by mass of Si; the balance Fe-20% by mass of Cr-2% by mass of Si-2% by mass of Mo; the balance Fe-10% by mass of Si-5% by mass of Al; the balance Fe-18% by mass of Co-10% by mass of Cr-2% by mass of Mo-1% by mass of Al; the balance Fe-36% by mass of Ni; the balance Fe-45% by mass of Ni; the balance Fe-49% by mass of Co-2% by mass of V; the balance Fe-18% by mass of Co-10% by mass of Cr-2% by mass of Mo-1% by mass of Al; the balance Fe-17% by mass of Co-2% by mass of Cr-1% by mass of Mo; and the like.

The magnetic substance making up the conductor preferably has a coercive force of 40 A/m or more. According to such a configuration, when the honeycomb structure 10 is subjected to the electromagnetic induction heating, the temperature can be raised in a short period of time until a temperature at which water vaporizes (about 100° C.), and further until a temperature at which the catalyst is activated (about 300° C.). The magnetic substances having a coercive force of 40 A/m or more include the balance Fe-35% by mass of Co; the balance Fe-20% by mass of Co-1% by mass of V; the balance Fe-13% by mass of Cr-2% by mass of Si; the balance Fe-18% by mass of Cr; the balance Fe-16% by mass of Cr-8% by mass of Al; the balance Fe-49% by mass of Co-2% of V; the balance Fe-18% by mass of Co-10% by mass of Cr-2% by mass of Mo-1% by mass Al; the balance Fe-17% by mass of Co-2% by mass of Cr-1% by mass of Mo; and the like.

Non-limiting examples of the material of the non-conductive material contained in the composite material 13 that can be used herein include glass containing silicate, borate, or borosilicate; crystallized glass; ceramics; or glass, crystallized glass or ceramics containing other oxides; and the like.

Next, the method for producing the honeycomb structure 10 will be described. First, the honeycomb structure having the partition wall made of ceramics and the plurality of cells defined by the partition walls is produced. For example, when producing the honeycomb structure made of cordierite, a cordierite-forming raw material is firstly prepared as a green body. The cordierite-forming raw material contains a silica source component, a magnesia source component, and an alumina source component, and the like, in order to formulate each component so as to have a theoretical composition of cordierite crystal. Among them, the silica source component that can be used herein includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used herein includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used herein include at least one metal selected from the group consisting of iron, copper, zinc, lead, aluminum, and nickel, alloys mainly based on those metals (e.g., carbon steel and cast iron for the iron, and stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a confetti shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, a material containing both the conductor made of the desired magnetic substance or the like and the non-conductor made of glass or the like is filled in the cells in the region of 50% or less of the total length of the honeycomb dried body from the upstream side. Specifically, for example, magnetic powder and glass powder are blended in a volume ratio of 9:1, to which a binder, a dispersant, and water are added to prepare a composite material-forming slurry.

Subsequently, masks are applied onto some of the cells on the end face on the upstream side of the honeycomb dried body, and the end face is immersed in a storage container in which the plugging slurry is stored to fill the non-masked cells with the composite material-forming slurry. In this case, the composite material-forming slurry is filled in the cells in the region of 50% or less of the total length of the honeycomb dried body from the one end face. It is then dried and fired to obtain a honeycomb structure having the composite material filled in the cells in the region of 50% or less of the total length from the one end face. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

A method of filling the composite material-forming slurry is simply carried out by pushing a paste-like material into the cells with a spatula such as a squeegee. It is easy to control the depth by the number of squeegee processes to be pushed.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material. When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied throughout the outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Embodiment 2

Figure 3:
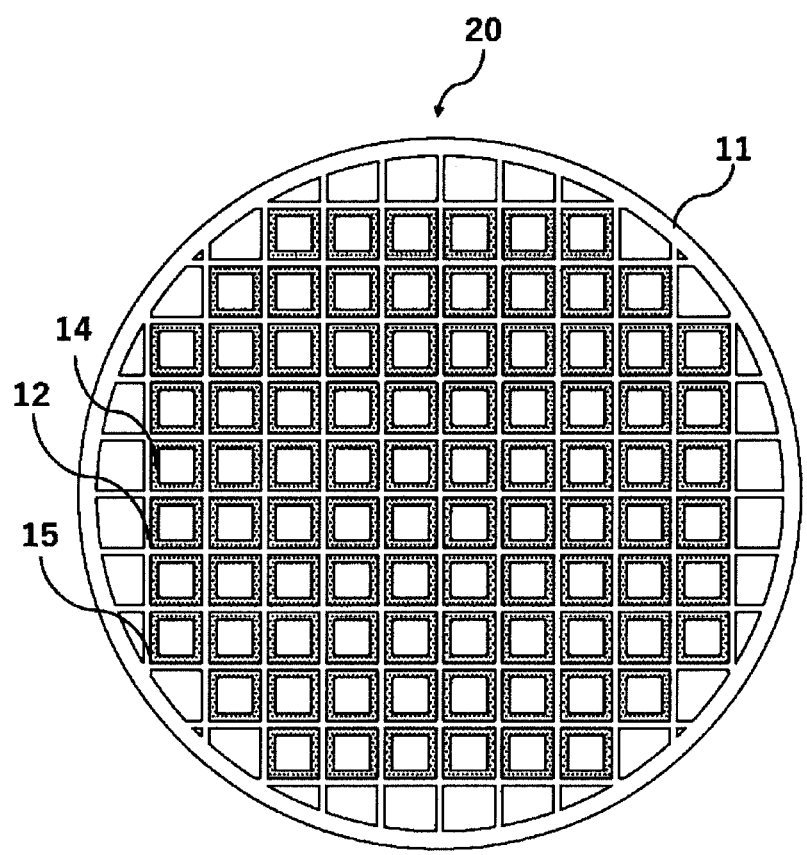
FIG. 3 is a schematic cross-sectional view of a honeycomb structure 20 according to Embodiment 2 of the present invention, which is perpendicular to an extending direction of cells 15.
Figure 4:
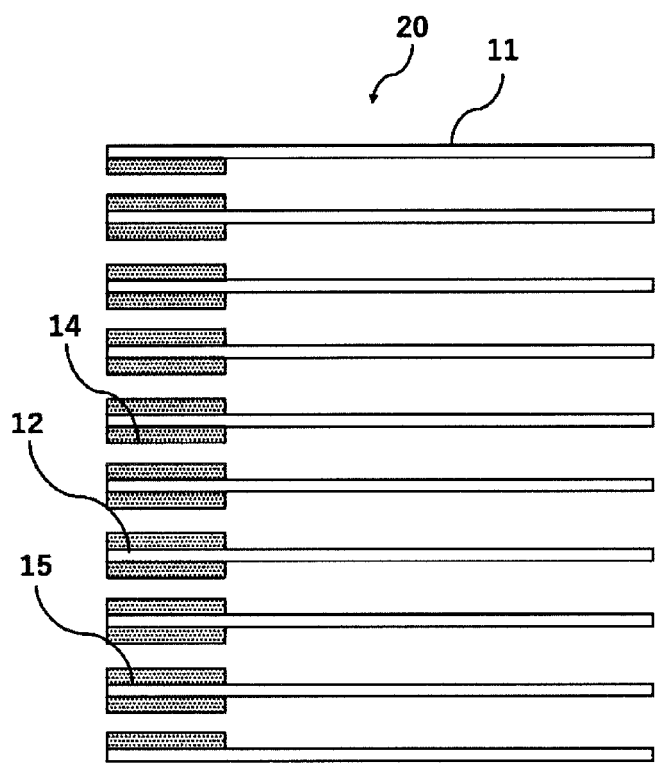
FIG. 4 is a schematic cross-sectional view of a honeycomb structure 20 according to Embodiment 2 of the present invention, which is parallel to an extending direction of cells 15.

FIG. 3 shows a schematic cross-sectional view of a honeycomb structure 20 for induction heating according to Embodiment 2 of the present invention, which is perpendicular to an extending direction of cells 15. FIG. 4 shows a schematic cross-sectional view of the honeycomb structure 20 according to Embodiment 2 of the present invention, which is parallel to the extending direction of the cells 15.

The structure of the honeycomb structure 20 for induction heating according to Embodiment 2 of the present invention is the same as that of the honeycomb structure 10 for induction heating according to Embodiment 1 of the present invention, with the exception that they have different arrangements and structures of the composite material 14. That is, the honeycomb structure 20 includes the composite material 14 composed of the conductor and the non-conductor in the cells 15 in the region of 50% or less of the total length from one end face, and the composite material 14 is provided in the form of thin film on the surface of the partition wall of the cells 15. The cells 15 provided with the composite material 14 may be arranged at intervals of one cell, or may be arranged at intervals of a plurality of cells, or may be continuously arranged, for the cells vertically and horizontally adjacent to each other.

The honeycomb structure 20 contains the conductor that generates heat in response to a change in a magnetic field in the cells 15 in the region of 50% or less of the total length from one end face, and only the region of 50% or less of the total length of the honeycomb structure 20 from one end face is surrounded by the coil and subjected to induction heating, so that the conductor can be allowed to generate heat. Therefore, as described in Embodiment 1 of the present invention, the power consumption of the honeycomb structure 20 during induction heating is suppressed. Further, the structure of the exhaust gas purification system using the honeycomb structure 20 can be simplified. Further, since the composite material 14 contains not only the conductor but also the non-conductor having a thermal expansion coefficient or Young's modulus lower than that of the conductor, the thermal stress generated by the thermal expansion of the composite material 14 when the honeycomb structure 20 is heated is relaxed, so that the breakage of the cells 15 can be satisfactorily suppressed.

The honeycomb structure 20 includes the composite material 14 provided in the form of thin film on the surface of the partition wall of the cells 15, so that the cells 15 provided with the composite material 14 is more suitably used as an exhaust gas flow path.

The thickness of the composite material 14 in the form of thin film is preferably 5 to 100 μm. The thickness of the composite material 14 of 5 μm or more results in an improved induction heating efficiency of the honeycomb structure 10. Further, the thickness of the composite material 14 of 100 μm or less allows the cells 15 provided with the composite material 14 to be more suitably used as an exhaust gas flow path. The thickness of the composite material 14 in the form of thin film is more preferably 5 to 60 μm, and even more preferably 10 to 40 μm.

A method for producing the honeycomb structure 20 according to Embodiment 2 according to the present invention is the same as that for producing the honeycomb structure 10 according to Embodiment 1 according to the present invention, with the exception that they have different composite material forming steps. Therefore, an example of the composite material forming step in the method for producing the honeycomb structure 20 will be described below.

In the composite material forming step in the method for producing the honeycomb structure 20, first, a binder, a dispersant, and water are mixed with the material containing both the conductor and the non-conductor to prepare a paste, which is injected inside the cells. The paste is dried, degreased and then baked onto the surface of the partition wall in the cells in a vacuum atmosphere to coat the surface of the partition wall in the cells of the honeycomb dried body. The composite material 14 provided in the form of the thin film on the surface of the partition wall 12 of the cells 15 can be thus produced.

Embodiment 3

Figure 5:
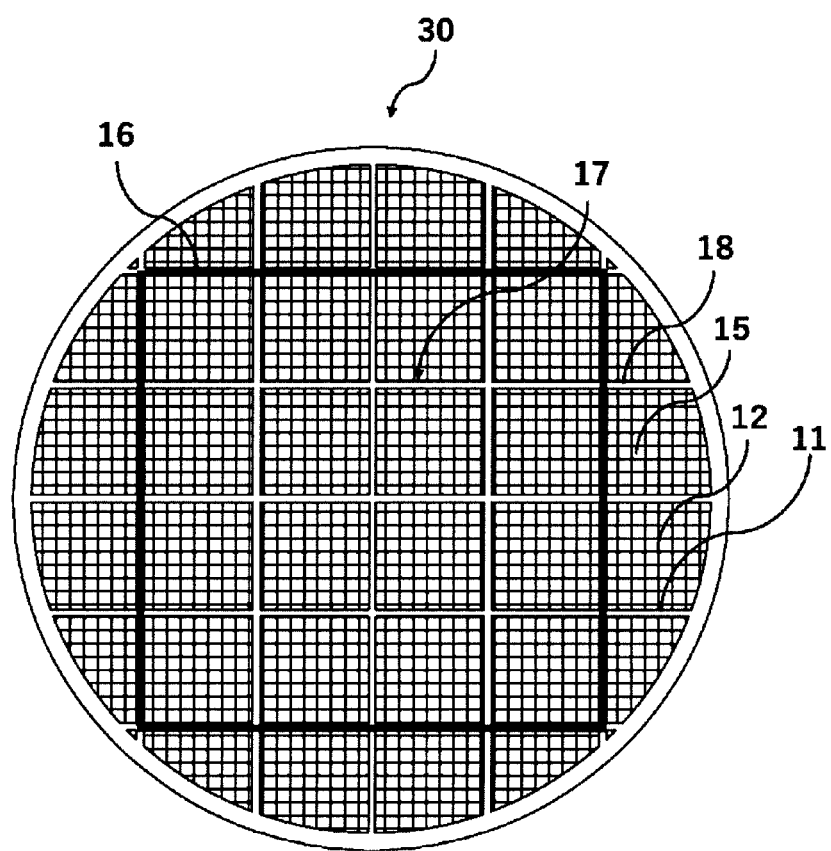
FIG. 5 is a schematic cross-sectional view a honeycomb structure 30 for induction heating according to Embodiment 3 of the present invention, which is perpendicular to an extending direction of cells 15.
Figure 6:
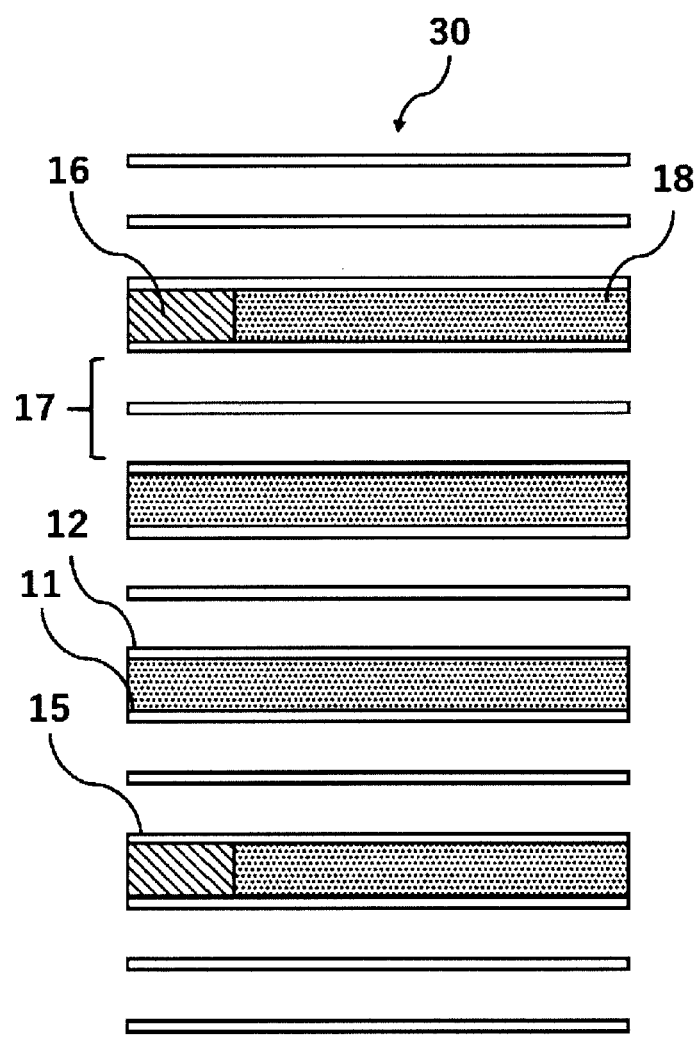
FIG. 6 is a schematic cross-sectional view of a honeycomb structure 30 according to Embodiment 3 of the present invention, which is parallel to an extending direction of cells 15.

FIG. 5 shows a schematic cross-sectional view of a honeycomb structure 30 for induction heating according to Embodiment 3 of the present invention, which is perpendicular to an extending direction of cells 15. FIG. 6 shows a schematic cross-sectional view of the honeycomb structure 30 according to Embodiment 3 of the present invention, which is parallel to the extending direction of the cells 15.

The honeycomb structure 30 is formed into a pillar shape. The honeycomb structure 30 is configured such that a plurality of pillar shaped honeycomb segments 17 are joined via joining material layers 18. Each honeycomb segment 17 includes: an outer peripheral wall 11 and a partition wall 12 made of ceramics, which is disposed on an inner side of the outer peripheral wall 11 and defines a plurality of cells 15 each extending from upstream to downstream in a gas flow direction to form a flow path.

The joining material forming the joining material layer 18 is not particularly limited as long as the surfaces of the outer peripheral walls 11 of the honeycomb segments 17 can be joined to each other with good adhesive force. The joining material forming the joining material layer 18 may contain, for example, inorganic particles, and inorganic fibers or colloidal oxides as other components. At the time of joining the honeycomb segments 17, a paste may be used, which is obtained by adding, in addition to these components, an organic binder such as methyl cellulose and carboxymethyl cellulose, a dispersant, water and the like as needed, and mixing and kneading them together using a kneader such as a mixer. The thickness of the joining material layer is preferably 0.3 to 2 mm, and more preferably 0.5 to 1.5 mm, from the viewpoint of the joinability between the honeycomb segments 17.

The material for forming the inorganic particles contained in the joining material making up the joining material layer 18 that can be used herein includes, for example, ceramics selected from silicon carbide, silicon nitride, cordierite, alumina, mullite, zirconia, zirconium phosphate, aluminum titanate, titania and a combination thereof; Fe—Cr—Al-based metal; nickel-based metal; silicon-silicon carbide-based composite material; and the like.

The inorganic fiber contained in the joining material making up the joining material layer 18 that can be suitably used herein includes ceramic fibers such as aluminosilicate, mullite and silicon carbide, and metal fibers such as copper and iron. Preferable colloidal oxide includes silica sol, alumina sol and the like. The colloidal oxide is suitable for giving an appropriate adhesive force to the joining material, and can be bonded to the inorganic fibers and particles by drying and degreasing, so that the joining material after drying will be firm with excellent heat resistance and the like.

In the honeycomb structure 30, the conductor 16 is provided in the joining material layer 18 in the region of 50% or less of the total length from one end face. The conductor 16 is a conductor that generates heat in response to a change in a magnetic field, and can be formed by using the same material as that of the conductor contained in the composite materials 13, 14 as shown in Embodiments 1 and 2 of the present invention.

The honeycomb structure 30 includes the conductor 16 that generates heat in response to the change in the magnetic field in the joining material layer 18 in the region of 50% or less of the total length from one end face, and only the region of 50% or less of the total length of the honeycomb structure 30 from one end face is surrounded by the coil and is subjected to induction heating to generate heat. Therefore, as described in Embodiments 1 and 2 of the present invention, the power consumption of the honeycomb structure 30 during induction heating is suppressed. Further, the structure of the exhaust gas purification system using the honeycomb structure 30 can be simplified. Further, since the conductor 16 is provided in the joining material layer 18, the thermal expansion of the honeycomb segment 17 during the heating of the honeycomb structure 30 is alleviated, so that the damage of the cells 15 can be satisfactorily suppressed. Further, since the conductor 16 is provided in the joining material layer 18 rather than in the cells 15 which are the flow paths for the exhaust gas, the purification efficiency of the exhaust gas can be more improved.

The conductor 16 may be provided in the joining material layer 18 so as to be mixed with the joining material making up the joining material layer 18. Further, the conductor 16 may be provided so as to be arranged in a part of the joining material layer 18.

In the embodiment as shown in FIG. 5, the conductor 16 is provided in the joining material layer 18 in a loop shape so as to surround the plurality of honeycomb segments 17. Further, in the joining material layer 18, a layer in which the conductor 16 and the joining material coexist may be provided in a loop shape so as to surround the plurality of honeycomb segments 17. According to such a structure, the conductor 16 is provided in the loop shape, so that an electric current easily flows so as to orbit the conductor 16 provided in the loop shape by electromagnetic induction heating, and an eddy current tends to be generated. Therefore, electromagnetic induction heating is sufficiently possible even at a relatively low frequency of several tens of kHz or less. Further, since the eddy current is easily generated by the conductor 16 provided in the loop shape, there is no limitation due to the Curie point of the material such as the fact that a ferromagnetic material must be used for the conductor 16, so that the honeycomb structure 30 having a good heating rate can be obtained.

Figure 7:
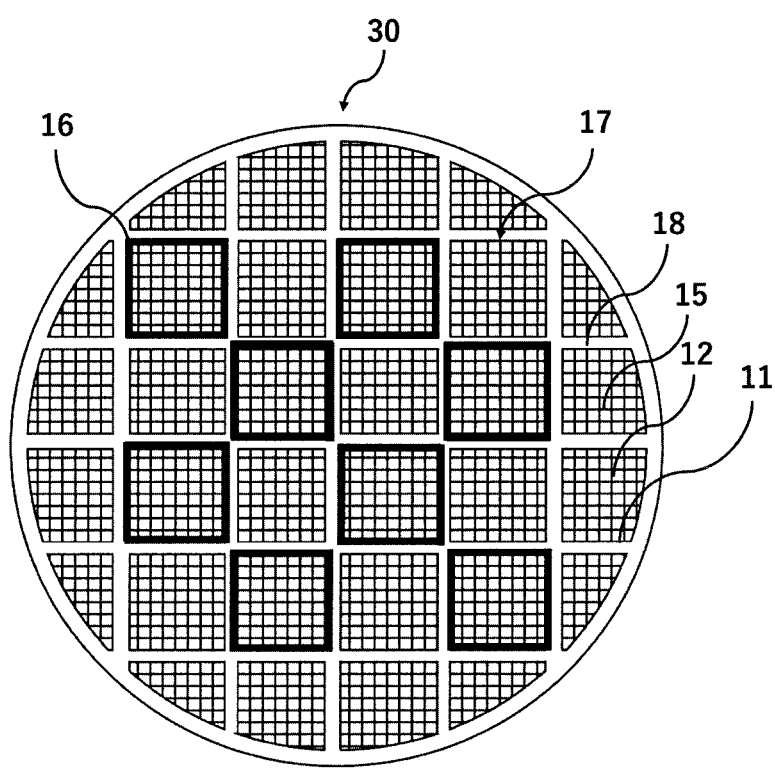
FIG. 7 is a schematic cross-sectional view of a honeycomb structure 30 for induction heating according to Embodiment 3 of the present invention, which is perpendicular to an extending direction of cells 15.
Figure 8:
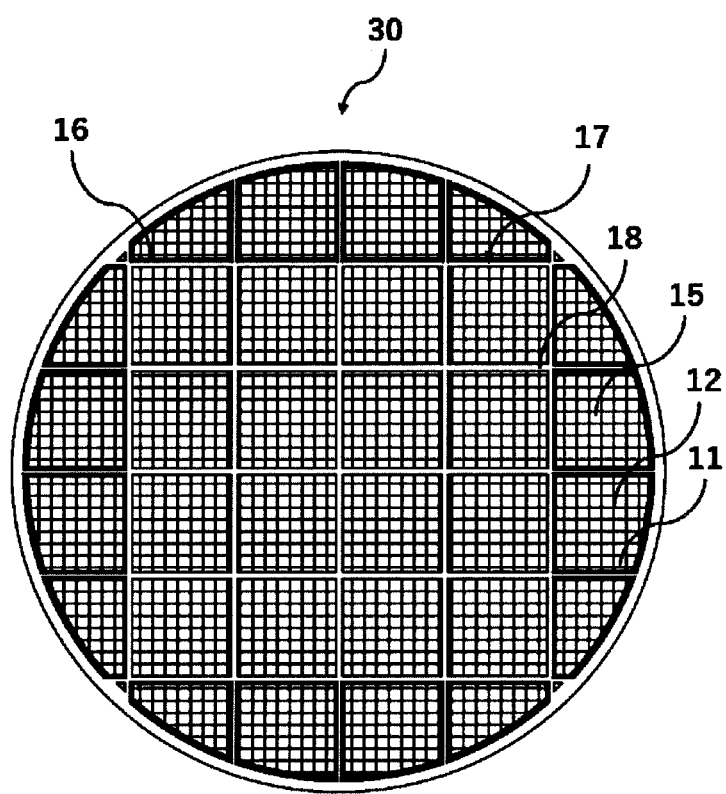
FIG. 8 is a schematic cross-sectional view of a honeycomb structure 30 for induction heating according to Embodiment 3 of the present invention, which is perpendicular to an extending direction of cells 15.

The arrangement of the conductor 16 in the joining material layer 18 is not particularly limited in the cross section perpendicular to the extending direction of the cells 15 of the honeycomb structure 30, and the conductor 16 may be arranged as shown in FIGS. 7 and 8, for example. In FIG. 7, the conductors 16 are arranged in each independent loop at intervals of one segment for the honeycomb segments 17 adjacent to each other in the vertical and horizontal directions so as to surround the honeycomb segments 17. Further, in FIG. 8, the conductors 16 are arranged in each independent loop so as to surround all the honeycomb segments 17 provided on the outermost side.

The method for producing the honeycomb structure 30 according to Embodiment 3 of the present invention is the same as the that for producing the honeycomb structure 10 according to Embodiment 1 of the present invention until the honeycomb dried body is formed. Subsequently, the joining material is applied between the joining surfaces of the respective dried honeycomb bodies, thereby joining them via the joining material layers. In the joining step, a plurality of honeycomb segments can be stacked along an L-shaped receiving plate via the joining material layers to form a desired stacked structure, and the honeycomb segments can be pressurized as a whole to join them.

When the joining material is applied between the joining surfaces of the respective dried honeycomb bodies as described above, a conductor composed of a desired material is mixed with the joining material, or each of the joining material and the conductor is applied so that the conductor forms a part of the joining material layer.

<2. Exhaust Gas Purification Catalyst>

An exhaust gas purification catalyst 40 according to an embodiment of the present invention includes: one of the honeycomb structures 10, 20, 30 according to Embodiments 1 to 3; and a catalyst supported in the cells of one of the honeycomb structures 10, 20, 30. The catalyst supported in the cells 15 of the honeycomb structure 10, 20, 30 is at least one selected from the group consisting of oxidation catalysts, three-way catalysts, $NO_x$ storage reduction catalysts, $NO_x$ selective reduction catalysts, hydrocarbon adsorption catalysts, hydrocarbons, carbon monoxide oxidation catalysts, and ammonia slip (oxidation) catalysts.

The catalyst can be appropriately selected depending on the desired purpose of exhaust gas purification. Specific use examples of the exhaust gas purification catalyst 40 according to the embodiment of the present invention will be described below. Further, the method of supporting the catalyst is not particularly limited, and it can be carried out in accordance with the conventional method of supporting the catalyst on the honeycomb structure.

<3. Exhaust Gas Purification System>

Figure 9:
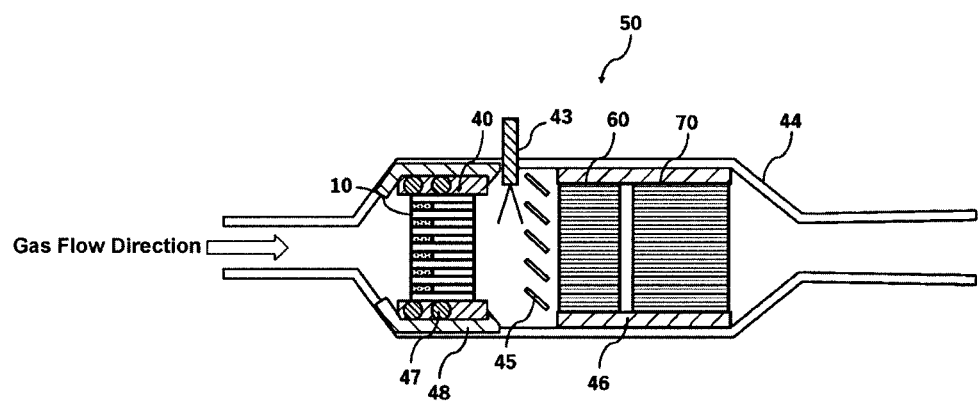
FIG. 9 is a schematic view of an exhaust gas purification system 50 according to an embodiment of the present invention.

FIG. 9 shows a schematic view of an exhaust gas purification system 50 according to an embodiment of the present invention. The exhaust gas purification system 50 includes: a honeycomb structure 10 arranged on an upstream side in a gas flow direction; and a honeycomb structure 60 and a honeycomb structure 70 each arranged on a downstream side of the honeycomb structure 10. The number of honeycomb structures arranged on the downstream side of the honeycomb structure 10 is not limited to two, and may be one or three or more. The position where the conductor 16 of the honeycomb structure 10 is provided may be a region of 50% or less of the total length from the end face on the upstream side in the gas flow direction, or may be a region of 50% or less of the total length from the end face on the downstream side in the gas flow direction.

Each honeycomb structure of the exhaust gas purification system 50 can appropriately support an appropriate catalyst according to a desired purpose. For example, the honeycomb structure 10 may be an exhaust gas purification catalyst 40 supporting a diesel oxidation catalyst, and either the honeycomb structure 60 or the honeycomb structure 70 may be a diesel particulate filter.

Each of the honeycomb structure 60 and the honeycomb structure 70 may be at least one selected from the group consisting of a honeycomb structure supporting the selective reduction catalyst, a honeycomb structure supporting the $NO$ storage reduction catalyst, a honeycomb structure supporting the ammonia slip catalyst, a honeycomb structure supporting the three-way catalyst and a honeycomb structure supporting the hydrocarbon adsorption catalyst.

The exhaust gas purification system 50 has a coil wiring 47 that spirally surrounds the outer periphery of the exhaust gas purification catalyst 40. The coil wiring 47 can be provided only on the outer peripheral portion corresponding to the composite material 13 provided in the cells 15 in the region of 50% or less of the total length of the honeycomb structure 10 from one end surface, and it can provide an improved heating efficiency of the honeycomb structure 10, and can simplify the exhaust gas purification system 50.

The exhaust gas purification system 50 has a metal pipe 44 for housing the honeycomb structures 10, 60, 70 and the coil wiring 47 via an inorganic mat material 46. The exhaust gas purification system 50 can be arranged in a diameter-increased portion of the metal pipe 44. Further, the exhaust gas purification system 50 may be a urea selective catalytic reduction system by providing a nozzle 43 for spraying urea water between the honeycomb structure 10 and the honeycomb structures 60, 70. In this case, it is preferable to provide a mixer 45 on the downstream side of the nozzle 43 for spraying urea water to mix the exhaust gas with the urea water.

FIG. 9 shows an example in which the honeycomb structure 10 according to Embodiment 1 of the present invention is used for the exhaust gas purification system 50. However, the present invention is not limited to this example, and the honeycomb structure 20 or the honeycomb structure 30 according to Embodiment 2 or 3 may be used for the exhaust gas purification system 50 in place of the honeycomb structure 10.

In the exhaust gas purification system 50, a temperature of the honeycomb structure 10 is increased in response to the change in the magnetic field according to the alternating current flowing through the coil wiring 47. In this case, the conductor of the composite material 13 provided in the cells 15 in the region of 50% or less of the total length of the honeycomb structure 10 from one end surface generates heat, so that the conductor is heated over the total length of the honeycomb structure 10. Therefore, when the honeycomb structure 10 supports the catalyst, the increase in the temperature of the honeycomb structure 10 raises a temperature of the catalyst supported by the catalyst support contained in the honeycomb structure 10 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

Further, the gas heated through the honeycomb structure 10 passes through the honeycomb structures 60, 70 on the downstream side, exerts each predetermined function, and purifies the exhaust gas.

Figure 11A:
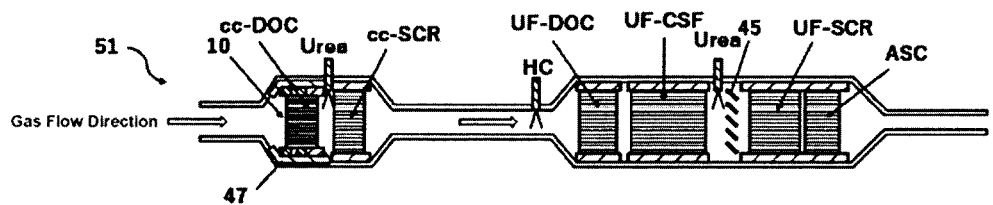
FIGS. 11A-11C are schematic views of exhaust gas purification systems 51, 52, 53 according to an embodiment of the present invention.
Figure 11B:
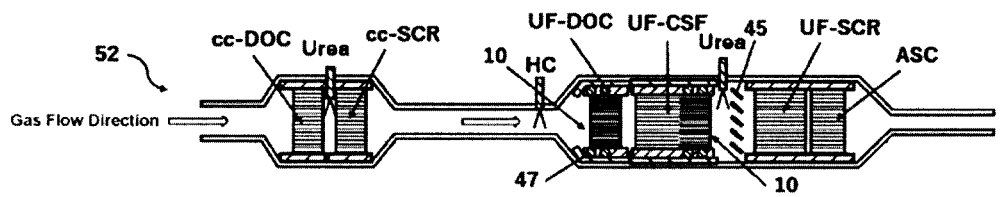
Figure 11C:
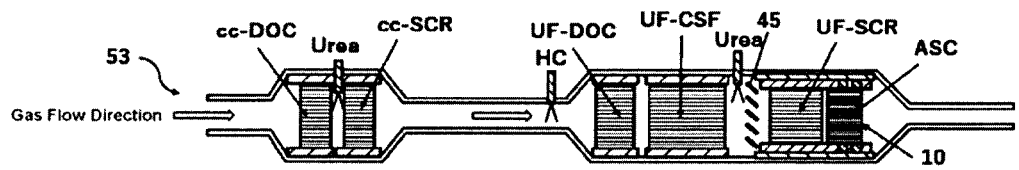

FIGS. 11A to 11C are schematic views of exhaust gas purification systems 51, 52, and 53 according to an embodiment of the present invention, which have each different structure from that of the exhaust gas purification system 50 as shown in FIG. 9. The combination of the catalyst supports is the same for all the three embodiments, but they have different induction heating sites depending on the purpose of heating. In each of FIGS. 11A to 11C, "DOC" represents the oxidation catalyst, "SCR" represents the selective reduction catalyst, "CSF" represents the oxidation catalyst, "Urea" represents urea, and "HC" represents the hydrocarbon, "ASC" represents the ammonia slip catalyst, "cc-" indicates that subjects are directly under the engine, and "UF" represents underfloor. Each of the embodiments as shown in FIGS. 11A to 11C also show an example for carrying out the present invention, and the exhaust gas purification system according to the present invention is not limited to these embodiments.

In order to heat the oxidation catalyst (cc-DOC) directly under the engine, which is the most upstream gas flow, the exhaust gas purification system 51 as shown in FIG. 11A is provided with the conductor on the upstream side of the gas flow of the honeycomb structure supporting that catalyst, and this is used as the honeycomb structure 10 according to the embodiment of the present invention. According to such a structure, the oxidation catalyst body (cc-DOC) on the most upstream is heated, whereby the purification performance as a system can be improved. Therefore, in particular, it can solve the problem that the purification performance of the entire system is deteriorated because the catalytic activity is not sufficient at the time of starting at a low temperature.

In order to heat the underfloor oxidation catalyst (UF-DOC), the exhaust gas purification system 52 as shown in FIG. 11B is provided with the conductor on the upstream side of the gas flow of the honeycomb structure supporting that catalyst, and this is used as the honeycomb structure 10 according to the embodiment of the present invention. The hydrocarbon (HC) sprayed from the nozzle located on the upstream side under the floor is oxidized by the oxidation catalyst (UF-DOC) and contributes to raising the exhaust gas temperature due to the oxidative heat generation. The UF-DOC is heated by the induction heating as described above, whereby an increase in the exhaust gas temperature can be promoted. Further, the honeycomb structure of the oxidation catalyst body (UF-CSF) in the subsequent stage is also provided with the conductor on the downstream side of the gas flow, and this is used as the honeycomb structure 10 according to the embodiment of the present invention, whereby not only the own honeycomb structure can be heated, but also the urea sprayed from the nozzle downstream of the honeycomb structure can be heated together. This can allow the decomposition of urea into ammonia can be promoted, thereby allowing the SCR catalyst downstream to function more effectively.

In the exhaust gas purification system 53 as shown in FIG. 11C, the conductor is provided on the upstream side of the gas flow of the honeycomb structure of the ammonia slip catalyst (ASC) on the most downstream side, and this is used as the honeycomb structure 10 according to the embodiment of the present invention. The ammonia slip catalyst aims at oxidization of ammonia in order to prevent the harmful substance ammonia from being discharged to the outside air as an exhaust gas component, but the activity of the catalyst is not sufficient at the time of starting immediately after the engine is stopped. In such a case, it is compensated with the induction heating, so that the purification performance can be improved.

EXAMPLES

Hereinafter, Examples are provided for a better understanding of the present invention and its advantages. However, the present invention is not limited to Examples.

Example 1

Thirty grams of magnetic powder having a composition of Fe-49% by mass of Co-2% by mass of V and an average particle diameter of 8 μm was mixed with glass frits having an average particle diameter of 2 μm so as to have a mass ratio of 2:1. Further, a foaming resin for adjusting the porosity, carboxymethyl cellulose, and water were mixed to prepare a slurry. The resulting slurry was filled at the positions inside the cells shown in FIG. 2 to a depth of 10 mm only on one end face of a cylindrical cordierite honeycomb structure having a diameter of 82 mm, a length of 85 mm, a thickness of the partition wall of 0.1 mm, and a distance between partition walls of about 1 mm, and then baked at 1000° C. to provide a composite material. In this case, the region where the composite material was formed corresponds to a region of 12% of the total length of the honeycomb structure from one end face. The porosity of the resulting composite material was 58% as a result of polishing, SEM, and image analysis.

Figure 10:
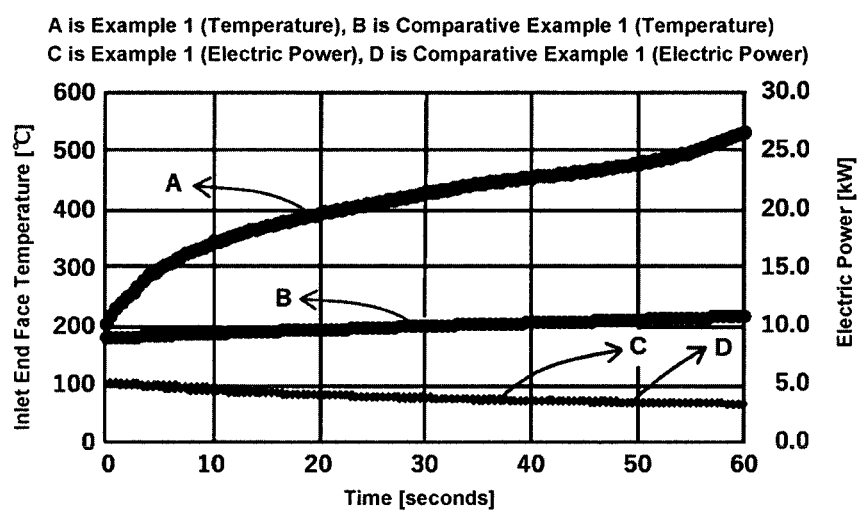
FIG. 10 is a graph showing a relationship between time (seconds) and temperature (° C.) according to Example 1 and Comparative Example 1.

The honeycomb structure provided with the above composite material was then placed in a quartz glass tube having an inner diameter of 90 mm, and warm air heated to 200° C. was blown into the quartz glass tube at 0.5 Nm$^3$/min. Subsequently, an induction heating coil having a diameter of 100 mm was wound around the end portion on the upstream side of the gas flow so that only the composite material provided at a depth of 10 mm from the end face of the upstream side of the gas flow of the honeycomb structure could be heated, and a heating test of the honeycomb structure was then carried out using an induction heating device. The temperature of the end face on the upstream side of the gas flow of the honeycomb structure was measured with an infrared thermometer. The power input was 3 to 6 kW, the induction heating frequency was 450 kHz, and the temperature-increasing performance of the honeycomb structure was measured. As the test results, FIG. 10 shows a graph showing the relationship between time (seconds) and temperature (° C.) according to Example 1.

Comparative Example 1

The slurry according to Example 1 was filled in the cells over the total length of the honeycomb structure having the same size as that of Example 1 and then baked at 1000° C. to provide a composite material. In this case, the region where the composite material was formed corresponds to a region of 100% of the total length of the honeycomb structure from one end face.

The honeycomb structure filled with the composite material was placed in the same test device as described above. However, the induction heating coil having a diameter of 100 mm was wound so that the entire support in which the composite material was present could be heated as much as possible. The temperature-increasing performance was then measured under the same conditions as those of Example 1. As the test results, FIG. 10 shows a graph showing the relationship between time (seconds) and temperature (° C.) according to Comparative Example 1.

Example 1 and Comparative Example 1 used the same weight of the magnetic material used for the composite material and the same honeycomb structure to be heated, and were carried out under substantially the same condition of the input power for induction heating. However, as shown in FIG. 10, it was found that Example 1 was heated faster than that of Comparative Example 1 and could efficiently increase the temperature of the gas passing through the portion where the composite material containing the magnetic substance in the honeycomb structure was present.

DESCRIPTION OF REFERENCE NUMERALS 10, 20, 30, 60, 70 honeycomb structure
11 outer peripheral wall
12 partition wall
13, 14 composite material
15 cell
16 conductor
17 honeycomb segment
18 joining material layer
40 exhaust gas purification catalyst
43 nozzle
44 metal pipe
45 mixer
46 inorganic mat material
47 coil wiring
48 electromagnetic shield portion
50, 51, 52, 53 exhaust gas purification system

The invention claimed is:

1. A pillar shaped honeycomb structure for induction heating, the honeycomb structure being made of ceramics and comprising:
   an outer peripheral wall; and
   a partition wall disposed on an inner side of the outer peripheral wall, the partition wall defining a plurality of cells, each of the cells penetrating from one end face to other end face to form a flow path,
   wherein a composite material comprising a conductor and a non-conductor is provided in the cells in a region of 50% or less of the total length of the honeycomb structure from one end face, and
   wherein the conductor is a conductor that generates heat in response to a change in a magnetic field.

2. The honeycomb structure for induction heating according to claim 1, wherein the composite material is provided in a form of a thin film on a surface of the partition wall of the cells.

3. The honeycomb structure for induction heating according to claim 1, wherein the composite material is filled inside the cells.

4. The honeycomb structure for induction heating according to claim 1, wherein the composite material comprises 50 to 95% by mass of the conductor.

5. The honeycomb structure for induction heating according to claim 1, wherein the composite material has a porosity of 30 to 70%.

6. The honeycomb structure for induction heating according to claim 1, wherein the conductor is a porous body.

7. The honeycomb structure for induction heating according to claim 1, wherein the conductor is a magnetic substance.

8. The honeycomb structure for induction heating according to claim 1, wherein the partition wall and the outer peripheral wall comprise at least one ceramics selected from the group consisting of cordierite, silicon carbide, aluminum titanate, silicon nitride, mullite, and alumina.

9. The honeycomb structure for induction heating according to claim 1, wherein the honeycomb structure has a diameter of 150 mm or more or a volume of 3 L or more.

10. An exhaust gas purification system, comprising:
    the honeycomb structure A according to claim 1, the honeycomb structure A being arranged on an upstream side in a gas flow direction; and
    at least one honeycomb structure B arranged on a downstream side of the honeycomb structure A.

11. The exhaust gas purification system according to claim 10, wherein a position of the honeycomb structure A where the conductor is arranged is a region of 50% or less of the total length from the end face on the upstream side in the gas flow direction.

12. The exhaust gas purification system according to claim 10, wherein a position of the honeycomb structure A where the conductor is arranged is a region of 50% or less of the total length from the end face on the downstream side in the gas flow direction.

13. The exhaust gas purification system according to claim 10, wherein the honeycomb structure A supports a diesel oxidation catalyst, and the honeycomb structure B comprises a diesel particulate filter.

14. The exhaust gas purification system according to claim 10, wherein the honeycomb structure B further comprises at least one selected from the group consisting of a honeycomb structure supporting a selective reduction catalyst, a honeycomb structure supporting a $NO_x$ storage reduction catalyst, a honeycomb structure supporting an ammonia slip catalyst, a honeycomb structure supporting a three-way catalyst and a honeycomb structure supporting a hydrocarbon adsorption catalyst.

15. An exhaust gas purification catalyst, comprising:
    the honeycomb structure according to claim 1; and
    a catalyst supported in the cells of the honeycomb structure,
    wherein the catalyst is at least one selected from the group consisting of oxidation catalysts, three-way catalysts, $NO_x$ storage reduction catalysts, $NO_x$ selective reduction catalysts, hydrocarbon adsorption catalysts, hydrocarbons, carbon monoxide oxidation catalysts, and ammonia slip catalysts.

16. A pillar shaped honeycomb structure for induction heating, the honeycomb structure comprising pillar shaped honeycomb segments joined together via joining material layers,
    wherein each of the pillar shaped honeycomb segments comprises: an outer peripheral wall; and a partition wall disposed on an inner side of the outer peripheral wall, the partition wall defining a plurality of cells, each of the cells penetrating from one end face to other end face to form a flow path, and
    wherein a conductor is provided in the joining material layers in a region of 50% or less of the total length of the honeycomb structure from one end face, and
    wherein the conductor is a conductor that generates heat in response to a change in a magnetic field.

* * * * *